United States Patent
Jones et al.

(10) Patent No.: US 10,758,963 B2
(45) Date of Patent: Sep. 1, 2020

(54) CONTINUOUS MOTION POSITION CONTROLLED SEAMER

(71) Applicants: Jared Jones, Golden, CO (US); Matthew Wetterlin, Littleton, CO (US); Michael Hoffman, Littleton, CO (US)

(72) Inventors: Jared Jones, Golden, CO (US); Matthew Wetterlin, Littleton, CO (US); Michael Hoffman, Littleton, CO (US)

(73) Assignee: CODI MANUFACTURING, INC., Golden, CO (US)

( * ) Notice: Subject to any disclaimer, the term of this patent is extended or adjusted under 35 U.S.C. 154(b) by 244 days.

(21) Appl. No.: 15/696,412

(22) Filed: Sep. 6, 2017

(65) Prior Publication Data
US 2018/0065167 A1    Mar. 8, 2018

Related U.S. Application Data

(60) Provisional application No. 62/384,094, filed on Sep. 6, 2016.

(51) Int. Cl.
  *B21D 51/26*    (2006.01)
  *B65G 33/04*    (2006.01)
  (Continued)

(52) U.S. Cl.
  CPC ..... *B21D 51/2692* (2013.01); *B21D 51/2653* (2013.01); *B21D 51/2661* (2013.01);
  (Continued)

(58) Field of Classification Search
  CPC ............... B21D 51/26; B21D 51/2653; B21D 51/2661; B21D 51/2692; B21D 51/30;
  (Continued)

(56) References Cited

U.S. PATENT DOCUMENTS

| | | | | |
|---|---|---|---|---|
| 931,434 | A * | 8/1909 | Krummel ............... | B21D 51/32 413/37 |
| 1,103,643 | A * | 7/1914 | Abrams ................. | B21D 51/32 413/35 |

(Continued)

FOREIGN PATENT DOCUMENTS

| DE | 19916225 A1 * | 10/2000 | ............ B65G 33/04 |
|---|---|---|---|
| GB | 388958 A | 3/1933 | |

OTHER PUBLICATIONS

Machine Translation of DE 19916225, Translated Aug. 8, 2019, 3 Pages (Year: 2000).*

*Primary Examiner* — Gregory D Swiatocha
(74) *Attorney, Agent, or Firm* — Optima Law Group, APC; Craig W. Barber; Thomas E. Jurgensen

(57) ABSTRACT

A continuous motion position controlled in-line linear seamer allows a manufacturer or brewery such as a microbrewery to have high speed can seaming (attachment of lids to full cans of beverage) with a single compact, inexpensive, independent and repositionable seaming machine. The seaming is carried out in-line with production, and is done using a linear can path with no need for a large carousel. The motion is continuous because a variable pitch worm drive is constantly operating, driving cans at different speeds for different portions of the can path, including one portion of the path at which the can may remain motionless while being seamed.

4 Claims, 15 Drawing Sheets

(51) Int. Cl.
 B21D 51/32 (2006.01)
 B65G 33/26 (2006.01)
(52) U.S. Cl.
 CPC .............. B21D 51/32 (2013.01); B65G 33/04 (2013.01); B65G 33/265 (2013.01); B65G 2201/0252 (2013.01)
(58) Field of Classification Search
 CPC ...... B21D 51/32; B65G 33/30; B65G 33/265; B65G 33/04; B65G 2201/0252; B65G 2812/0511; B65G 2812/0538
 USPC ........ 413/2, 3, 6, 27, 31, 35–38, 45, 52, 74; 198/660, 661, 459.3
 See application file for complete search history.

(56) References Cited

U.S. PATENT DOCUMENTS

| | | | | |
|---|---|---|---|---|
| 1,614,041 | A * | 1/1927 | Nordquist | B21D 51/32 413/45 |
| 1,640,762 | A * | 8/1927 | Fink | B21D 51/32 413/35 |
| 1,716,618 | A * | 6/1929 | Bryant | B21D 51/32 413/32 |
| 1,975,022 | A * | 9/1934 | Scruggs | B21D 51/32 413/31 |
| 2,386,845 | A * | 10/1945 | Diezel | B21D 51/32 101/4 |
| 2,392,728 | A * | 1/1946 | Diezel | B21D 43/14 413/44 |
| 2,563,496 | A | 8/1951 | Schmidt | |
| 3,261,314 | A * | 7/1966 | Campbell | B21D 51/32 413/40 |
| 3,902,438 | A * | 9/1975 | Smith | B21D 51/32 413/37 |
| 4,513,487 | A | 4/1985 | Binnie et al. | |
| 5,193,329 | A * | 3/1993 | Loffredo | B65B 5/08 198/672 |
| 6,910,413 | B2 | 6/2005 | Tweedy et al. | |
| 2013/0108399 | A1* | 5/2013 | Aldred | B21D 51/2653 413/6 |

\* cited by examiner

CONTINUOUS MOTION POSITION CONTROLLED SEAMER

RELATED APPLICATION(S)

This application claims the priority and benefit of U.S. Provisional Application No. 62/384,094 filed Sep. 6, 2016 in the name of the same inventors and having the same title, the entire disclosure of which is incorporated herein by this reference.

FIELD OF THE INVENTION

The present invention relates generally to can filling such as is found in CPC class B67C, and specifically to smaller can seamers which seal a lid onto an open topped can during production.

BACKGROUND

The process of filling cans in bulk usually involves filling the can prior to putting the top onto the can. The process of sealing the top onto the can, called seaming, is carried out by "seamers".

Seamers come in two broad categories: large, extremely bulky, extremely expensive seamers used in very high volume operations such as large brand beverages, and small, quite slow seamers which are used by micro-breweries and the like.

The typical micro-brewery not only has no use for the speed capacity of the large type of seamer, it also has no space: large seamers are huge devices weighing several tons and taking up significantly more space than a micro-brewery can afford to spare.

On the other hand, the "one at a time" seamers used by micro-breweries will carry cans full of beverage to a station at which the can stops while a lid is seamed onto it individually, before jerking the line of cans back into motion and advancing another single can. Obviously this "start-stop" motion on the part of the cans is not only conducive to out-gassing and sloshing but in addition slows down production dramatically. This is one competitive disadvantage suffered by small craft breweries in comparison to large industrial breweries. Speeding up the seaming of micro-brews would increase production speed and thus lower production costs.

One more interesting disadvantage of this process is that since most micro-brewery can fillers work on several cans at once, for example, on four cans at once, four cans in a row are filled at the same moment, but then they are seamed one at a time, meaning that carbonization (CO2, N2 or other pressurizing agents in beer, soda pop or other beverages) will have unequal times to escape from the open topped cans. The first can in any group of four will be seamed shut first, leaving more of the gas in solution in the beer. The second can will sit a bit longer, and outgas a bit more, before being sealed. The third can will sit a little bit longer yet, and the fourth can will sit for even longer. This means that the "stiffness" (related to the degree of dissolved gases) of each can will be different from that of the cans on either side. In the case of liquid charge dosing, where closely metered quantities of liquefied gas, such as nitrogen, are applied to the surface of the filled liquid prior to lid application, existing seaming methods and devices provide undesirable fluctuation in the amount of time between the steps of applying the dose of liquid, applying the lid, and seaming the lid. This inconsistent timing leads to unacceptable fluctuation in the final pressure within the sealed cans, due to the aforementioned escaping charge prior to seaming. This effect is especially detrimental when canning "still" beverages, or when utilizing internal pressurizing reservoirs, known as "widgets", which are charged through the liquid nitrogen dosing process.

The large rotary fillers are the most common type found in patent literature. These have star wheels, helical feed screws, and other large structures. In general none of them disclose the concept of lifting the can to the seaming rollers/heads while leaving it in contact, even engaged between the threads of, a continuous motion worm drive.

Turning to the prior art individually, we see a few items of interest.

For example, U.S. Pat. No. 2,563,496 is typical of the prior art: an elaborate and synchronized mechanical filler and seamer unit combined, which puts the lid onto the can prior to changing the direction of travel of the can (in an effort to reduce spillage). It is obviously quite expensive to produce.

U.S. Pat. No. 4,513,487 is for mufflers (vehicle exhaust mufflers) and is thus not relevant art. It operates on two ends of a muffler, not one, and seems to be hand loaded and thus also irrelevant to even small volume production such as microbrewing.

U.S. Pat. No. 6,910,413 uses timing screws to create specified dwell times at different stations of a can decorator. However, the bottles being decorated are carried in individual carriages and the carriages are connected to a worm drive which is not dimensioned and configured for a individual bottle/can. By and large, the apparatus is concerned with controlling the orientation of the bottles.

US Patent Publication No. 20130108399 is most relevant to the context of usage of the present invention, being also designed for smaller beverage manufacturers. This design however is very structurally different, using rotary air actuators and the like.

It would be preferable to provide a can seamer offering a more reliable device and a more reliable seam, as well as the potential for a higher speed of production than devices like the 20130108399 device, in a format suitable for small brewers.

It would further be preferable to provide a can seamer offering a straight through or at least linear can path, usable in-line with the production facility's can path.

It would also be preferable to provide a can seamer offering single device independent mobility, so that it can be easily integrated into existing small brewer production lines.

It would yet further be preferable to provide a continuous motion drive so that cans need not be seamed at irregular time intervals but more importantly so that production speed is increased, without the stop-start motion associated with prior art craft beer seamers

SUMMARY OF THE INVENTION

The present invention teaches a linear, in-line, continuous motion, position controlled, inexpensive, independent and mobile seamer.

The seamer of the invention is a small unit which can be mounted on wheels and moved around as needed, since it has no large carousel structure for moving cans in a circle: the cans move in a linear can path which is quite short. The seamer can be inexpensive, with a price not much higher than the quite inefficient seamers presently used by beverage producers of all types: coffee can be canned this way, it may be used by microbreweries, for carbonated beverage bottlers and so on. The seamer of the invention will operate in-line, that is, the cans may follow a can path which is a straight line with other parts of the production process such as the can filling. In one particularly desirable embodiment, the device will not be on wheels, but instead will be physically integrated into the filler machine itself, an arrangement (a combination of two machines into one) only made possible by the device's smaller size and weight. In one other desirable embodiment, the device will instead will be mounted in-line directly onto the end of the filler machine itself, a connection also only made possible by the device's smaller size and weight. Right-angle mounting brackets seen in some diagrams allow this direct-to-can-filler mounting, even to fillers made by other manufacturers.

Continuous motion of a worm drive which engages the cans between its threads allows production to avoid "start-stop" inefficiencies. For the portions of the seaming process which permit the can to move, the worm drive threads may have an angled pitch which moves the cans along the linear can path. For the portions of the seaming process in which the can must cease motion, a flat (no pitch angle) portion of the thread, called the "dwell", may allow the individual can to "sit still" (remain stationary) while the worm drive and all other cans engaged with the worm drive are all still in motion. By virtue of the continuous, positive engagement with the inline worm drive, the position of the can, and thereby the timing of any liquid charge dosing, lid application, and lid seaming, can be very precisely tailored to the application and maintained across a series of cans being filled and seamed at the exact dwell point of the worm drive. This superior control results in greater consistency in the resultant pressure condition within the can, which provides great benefits when filling containers of "still" beverages, or when using internal pressurizing reservoirs, such as widgets.

Seaming heads, can lifters and other parts of the invention may be driven using two or even one serpentine belt(s) to run pulleys, thus allowing two or even one electric motor to be the motive mechanism for the entire device.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

SUMMARY IN REFERENCE TO THE CLAIMS

It is therefore one aspect, advantage, objective and embodiment of the present invention, in addition to those mentioned above and below, to provide a continuous motion position controlled in-line linear seamer for use with an open top can and a lid to be seamed onto such can, such can having a closed bottom, such can possibly containing a liquid; the linear seamer comprising:

a linear can path down which such can is conveyed;

a variable pitch worm drive engaging such can, the variable pitch worm drive having a length and having angled threads, the threads dimensioned and configured to mechanically engage such can between adjacent threads, whereby in a first portion of the length of the worm drive the turning of the worm drive causes straight line motion of such can;

a lid supply which drops such lid onto such can open top at a first position of the worm drive;

a second ("dwell") portion of the length of the worm drive defining a second can position, the second portion of the worm drive having a flat pitch of the variable pitch worm drive threads, whereby in which second portion of the worm drive the turning of the worm drive causes such can to remain stationary in the second position despite the continuous motion of the worm drive;

at least one can seamer head positioned above such can when such can is disposed in the second position, the seamer head operative to seam such can lid to such can open top;

a third position of the worm drive having angled threads driving such can in straight line motion out of the second position and out of the seamer.

It is therefore a second aspect, advantage, objective and embodiment of the present invention, in addition to those mentioned above and below, to provide a linear seamer further comprising:

a drive motor driving a drive shaft;

at least a first pulley affixed to the drive shaft;

at least a first serpentine belt engaged to the first pulley whereby the first serpentine belt is driven by the drive motor;

a second pulley engaged to and driven by the serpentine belt, the second pulley affixed to a seamer shaft and the at least one seamer head attached to the seamer shaft, whereby the at least one seamer head is driven by the drive motor;

It is therefore another aspect, advantage, objective and embodiment of the present invention, in addition to those mentioned above and below, to provide a linear seamer wherein the drive motor is an electrical motor.

It is therefore another aspect, advantage, objective and embodiment of the present invention, in addition to those mentioned above and below, to provide a linear seamer further comprising a frame structure operative to support the elements of the linear seamer.

It is therefore another aspect, advantage, objective and embodiment of the present invention, in addition to those mentioned above and below, to provide a linear seamer further comprising:

a can lifter, the can lifter having a can lifter body and a can lifter head, the can lifter body when raised operative to elevate the can lifter head;

the can lifter being positioned below such can when such can is disposed in the second position, the can lifter operative to lift such can to the at least one seamer head.

It is therefore another aspect, advantage, objective and embodiment of the present invention, in addition to those mentioned above and below, to provide a linear seamer wherein the can lifter further comprises:

an aperture on the can lifter head.

It is therefore yet another aspect, advantage, objective and embodiment of the present invention, in addition to those mentioned above and below, to provide a linear seamer further comprising:

a vertical path cam having a first cam follower therein, the first cam follower linked to such cam lifter body and operative to lift such cam lifter body.

It is therefore an additional aspect, advantage, objective and embodiment of the present invention, in addition to those mentioned above and below, to provide a linear seamer further comprising:

further comprising:

a horizontal path cam having a second cam follower therein, the second cam follower linked to such cam lifter body and operative to shift such cam lifter body to match motions of such can while such can is in motion along part of the linear can path;

the vertical and horizontal cams together comprising a three dimensional motion cam assembly.

It is therefore even a further aspect, advantage, objective and embodiment of the present invention, in addition to those mentioned above and below, to provide a linear seamer further comprising:

an independent second drive motor operative to drive the three dimensional motion cam assembly.

It is therefore an additional aspect, advantage, objective and embodiment of the present invention, in addition to those mentioned above and below, to provide a linear seamer further comprising:

a third pulley engaged to and driven by the serpentine belt, the third pulley attached to a cam drive shaft;

the three dimensional motion cam assembly affixed to and driven by the cam drive shaft, whereby the three dimensional motion cam assembly is driven by the drive motor.

It is therefore yet one more aspect, advantage, objective and embodiment of the present invention, in addition to those mentioned above and below, to provide a linear seamer further comprising:

control circuitry, the control circuitry including at least a circuit breaker and a control device operative to control operation of one member selected from the group consisting of: the drive motor, the lid supply, the worm drive, the can lifter, the at least one seamer head and combinations thereof.

It is therefore one more aspect, advantage, objective and embodiment of the present invention, in addition to those mentioned above and below, to provide a linear seamer wherein the control circuitry control device further comprises: a programmable logic controller.

It is therefore yet one more aspect, advantage, objective and embodiment of the present invention, in addition to those mentioned above and below, to provide a linear seamer further comprising: a seamer head having a rotating central chuck dimensioned and configured to engage such lid and rotate such can against such seamer roll.

It is therefore yet one more aspect, advantage, objective and embodiment of the present invention, in addition to those mentioned above and below, to provide a linear seamer further comprising: a seamer head cam and seamer head follower controlling such seamer head motion.

It is therefore yet one more aspect, advantage, objective and embodiment of the present invention, in addition to those mentioned above and below, to provide a linear seamer further comprising: a seamer head chuck pulley mounted on a seamer head chuck shaft and connected to the seamer head chuck, the seamer head chuck pulley engaging the first serpentine belt.

And it is one more aspect, advantage, objective and embodiment of the present invention, to provide a linear seamer further comprising: a pneumatic lift physically engaged to and operative to bias the can lifter body upward. This list is not exclusive. Other aspects, advantages, objectives and embodiments of the present invention will be understood from the totality of this disclosure.

And it is one more aspect, advantage, objective and embodiment of the present invention, to provide a continuous motion position controlled in-line linear seamer for use with an open top can and a lid to be seamed onto such can, such can having a closed bottom, such can possibly containing a liquid; the linear seamer comprising:

a linear can path along which such can is conveyed by a variable pitch worm drive dimensioned and configured to engage such can, the variable pitch worm drive having a length and having angled threads, the threads dimensioned and configured to mechanically engage such can between adjacent threads;

the variable pitch worm drive parallel to the linear can path;

the variable pitch worm drive having a first portion of the length of the worm drive in which the pitch of the angled threads and the turning of the worm drive causes straight line motion of such can;

the variable pitch worm drive having a second portion of the length of the worm drive having a pitch of the angled threads which is perpendicular to the linear can path;

whereby in which second portion of the worm drive the turning of the worm drive causes such can to remain stationary in the second can position despite continuous motion of the worm drive.

And it is one more aspect, advantage, objective and embodiment of the present invention, to provide a method of seaming a lid onto a can in a can path, the method comprising the steps of:

providing a worm drive parallel to such can path, the worm drive having angled threads dimensioned and configured to mechanically engage to such can in such can path, the worm drive having a length and a second portion of the length in which the angled threads are perpendicular to the can path and a first and a third portion of the length in which the angled threads are neither perpendicular nor parallel to such can path;

rotating the worm drive with a continuous motion, whereby such can will be moved along such can path by the rotation of the worm drive when in the first portion of the worm drive length, will pause and sit stationary in the second portion of the worm drive length, and will resume moving along such can path in the third portion of the worm drive length;

providing a lid seamer;

seaming a lid to such can while such can is stationary in such can path in the second portion of the worm drive length.

And it is one more aspect, advantage, objective and embodiment of the present invention, to provide a method further comprising:

providing a seamer located above the second portion of the worm drive length, the seamer operative to perform the seaming step;

providing a can lifter positioned below such can when such can is disposed in the second portion of the worm drive length, the can lifter operative to lift such can to the seamer.

INDEX TO THE REFERENCE NUMERALS

Continuous motion seamer 100
Frame/structure 102
Variable pitch worm drive 104
Can lifter 106
Control equipment 108
Lid supply 110
Narrow thread (slower can motion going in) lower pitch angle 120
Wide thread (faster can motion going in) higher pitch angle 122
Seaming rolls 124
Mechanical drive (motor) 130
Main drive shaft 132
First serpentine drive belt 134
Second serpentine drive belt 136
Complex cam Trapped cam follower/hinged cam 152
Vertical cam 154
Trapped cam follower 156
Can lifter body 158
Can lifter head/base plate 160
Spring pressure adjustment 162
Seamer head 164
Seamer head central chuck pulley 166
Seamer head central chuck 168
Seamer roll cam follower 170
Seamer roll cam 172
Worm drive 204
Lifter head 260
Can path showing can at dwell point 274
Worm drive length 276
First portion 278
Second portion—Dwell 280
Third portion 282
Can 284
Provide worm gear 300
Provide can path 302
Provide seamer 304
Continuous rotation 306
Can motion through first portion 308
Can "motion" in second portion 310
Seam lid onto can while non-moving 311
Can motion through third portion 312

DETAILED DESCRIPTION OF EMBODIMENTS

Glossary

Figure 1:
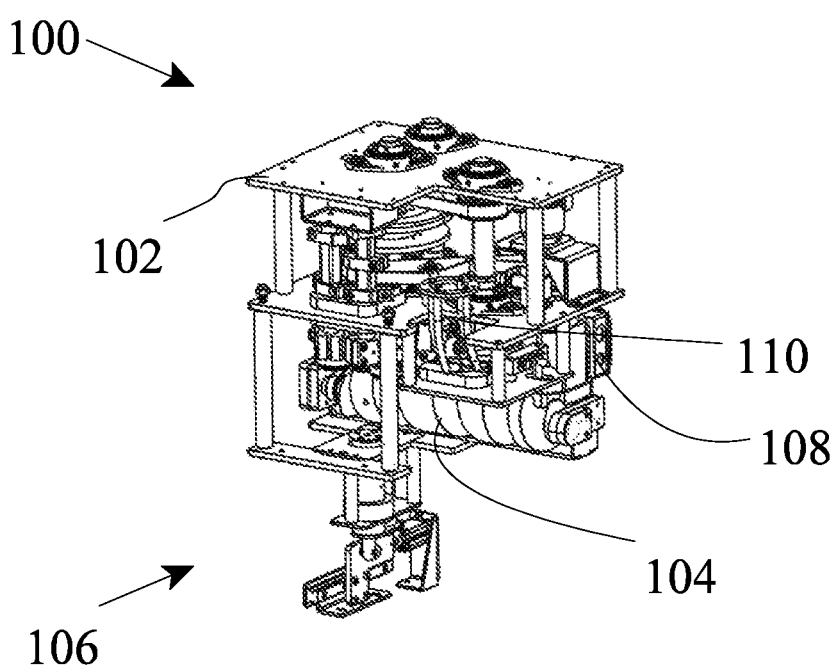
FIG. 1 is an elevated perspective view from the front and side of a first embodiment of the invention.

For purposes of this application, a "seamer" is a device which places a lid upon an open can (which may already have a beverage or other product within it).

A can may be any generally cylindrical body, which in production may be empty or filled with liquid or solid products. A can may have a bottom end which is closed, a top end which is open until a lid is seamed onto it, and an interior and exterior. Cans may be coated or uncoated and may be any material including aluminum, other metals, polymers, combinations and so on. One exemplary type of can might be a beer can having a closed bottom, a widget in the bottom, an open top, a capacity of between 187 ml and 48 ounces and beverage (beer) already in the can when it enters the seamer.

A seamer may advantageously be used in a production line after a can filling machine and prior to a machine for packaging cans. In small craft breweries, filling and seaming may be frustratingly slow, but the present invention allows a roll-in seamer which can instantly increase seaming speed.

Continuous motion in this application is done using the worm drive which engages the cans between its threads and by this means allows production to avoid "start-stop" inefficiencies, even when one can needs to remain stationary for a moment. Thus for the portions of the seaming process which permit or require the can to move—such as the entrance of the can from the can filling device or the exit of the can from the seamer—the worm drive threads may have an angled pitch which moves the cans along the linear can path. However, by adjusting the pitch of the threads, the can motion speed can be controlled without altering the worm drive speed: lower pitch means slower speed. In fact, for up to a large fraction of one rotation of the worm drive, a flat pitch to the threads may allow the can to sit entirely still, in what is termed the "dwell" of the screw. Thus for the dwell portions of the seaming process in which the can must cease motion, a flat (pitch angle of zero, 90 degrees perpendicular to the length of the worm drive) portion of the thread may allow the individual can to "sit still" (remain stationary), however, "continuous motion" is still occurring because the worm drive and all other cans engaged with the worm drive are all still in motion. This enormously speeds production.

In-line, as used herein, denotes a device suitable for micro-canning (perhaps relating to micro-brewing) usage without extreme alteration of the other parts of the production line. Thus the seamer of the invention may be simply rolled into place after a can filler and before other devices which may assist packaging or other steps. This "in-line" feature is related to being "linear" (a straight line can path during seaming) because the linearity allows much easier use in-line, however the two abilities are obviously slightly different. In particular, as discussed four paragraphs below, the "linear" feature may be altered to a can path which is curved or even has angles in it, by use of multiple worm drives or a flexible worm drive able to rotate while itself curved.

A worm drive as used herein is a very large screw (several inches across) with spaces between adjacent threads of sufficient size and proper shape (generally speaking a half-circle when seen from above) to mechanically engage to cans of the desired size. The worm drive may be switched out to allow the device to be used with different sizes of cans. A worm drive, by definition, drives something against which it sits, in this case, a sequence of individual cans.

Control circuitry may refer to simply a safety fuse or circuit breaker, or a manual switch, or variable adjustment devices such as variable resistors, or to digital control devices such as a PLC (programmable logic controller) or micro-controller.

A pneumatic lift is an air actuated, valve controlled cylinder which extends a lifter or piston when air pressure is applied.

Parallel as used herein means parallel at the exact position discussed. Obviously the can path may advantageously be straight and the worm drive as well, however, it is possible to make curved can paths and even curved worm drives, for example, flexible worm gears, multi-section worm gears and so on. All are covered by the claims herein, since as used herein the worm and the can path may be parallel (and parts of the worm threading perpendicular) even though both are curved or have complex shapes.

Perpendicular refers to being at a 90 degree angle, at the exact position discussed. The same caveats apply as found in the previous paragraph.

End Glossary

The following drawings form part of the present specification and are included to further demonstrate certain aspects of the present invention. The invention may be better understood by reference to one or more of these drawings in combination with the detailed description of specific embodiments presented herein.

FIG. 1 is an elevated perspective view from the front and side of a first embodiment of the invention. Continuous motion seamer 100 has frame/structural supports 102 which provide support and proper orientation for the various working parts of the device. Note that the continuous motion seamer 100 may also be part of the frame of a filler machine which fills the cans, thus providing a single machine to handle micro-brewery filling and micro-canning.

One of the ways in which variable pitch worm drive 104 is unique is in having gaps between the threads which are semi-circular when viewed from the side and have a radius approximately equivalent to the cans which the device is designed to move. Thus the cans in the can path will be caught by the first thread and then gently pushed along the can path, without use of any carriage, in a straight line. At the end of the path they are ejected from the seamer, fully seamed.

Can lifter 106 lifts cans up to the seamer heads (see later figures) and also adjusts the upward pressure of the can toward the seamer heads during seaming by means of a spring.

Control equipment 108 may be a PLC, simple breakers, switches, knobs, etc. In preferred embodiments, this includes a micro-controller which is user programmable and controls many or all aspects of operation of the device. Note that while such a controller might in alternative embodiments control the drive motor, the lid supply, the worm drive, the can lifter, the at least one seamer head and/or combinations thereof, in the presently most preferred embodiment all equipment is actually controlled by the speed of the motor acting through the serpentine belts on each item, except for a pneumatic lift (seen partially obscured in FIGS. 1 through 4) actuating the can lift and controlled by valves and an air cylinder. By varying the relationships of size of the pulleys on each item, relative speeds may be established and maintained without individual parts being controlled, an enormous savings in cost and headaches for users.

Lid supply 110 may contain a stack of lids which slide downward into place before being put atop the open upper end of each can. This lid supply 110 may in embodiments be placed at a portion of the can path/worm drive at which can speed is reduced by having differently angled threads.

A pneumatic lift may be seen which operates the can lifter and is controlled by valves.

Figure 2:
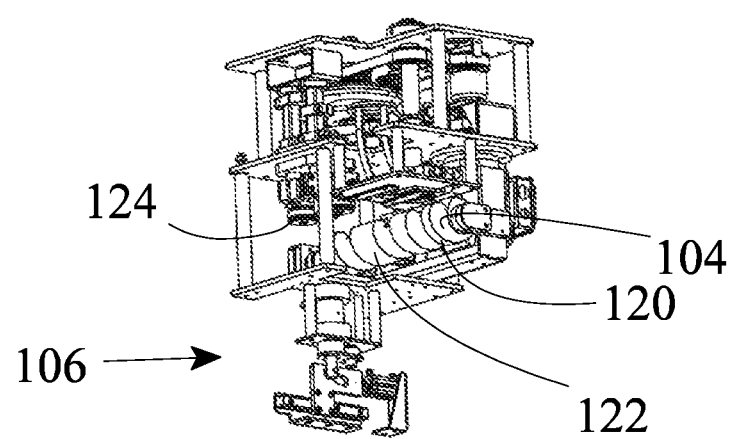
FIG. 2 is a depressed angle perspective view from the front and side of the first embodiment of the invention.

FIG. 2 is a depressed angle perspective view from the front and side of the first embodiment of the invention, showing two different pitch angles 122 and 120

High pitch angle (faster can motion going in) is shown in contrast to the low pitch angle thread (slower can motion going in). It will be obvious that the lower the angle of the threads the slower the cans progress, and that for periods of almost an entire worm gear revolution, a can in a "dwell" portion with no thread pitch at all (pitch angle zero) may actually sit still inside the continuous motion of the worm, the machine and the other, still moving, cans. A high pitched thread may then allow a can to accelerate to a higher travel speed and leave the dwell portion of the worm drive synchronized with all other cans. Thus pitch angles 120 and 122 allow control of can speed, even stopping the can in place under the seamer rolls 124 where the pitch angle is zero (dwell) for a substantial fraction of one circumference/rotation of the worm drive.

Seaming rolls 124 may crimp or bend the lid over the lip of the open topped can, sealing the can. The rolls/heads may rotate in some embodiments, however in the embodiment pictured in fact the rolls remain stationary while the can is rotated beneath them. The rolls are in the best mode presently contemplated not driven, they spin freely with the can when pressed against the lid by the can's upward motion to them. The central chuck in the seaming assembly drives the spinning.

Discussion of how the large cams atop the machine drive the seaming rolls is found below, in relation to FIG. 10 and FIG. 11.

Figure 3:
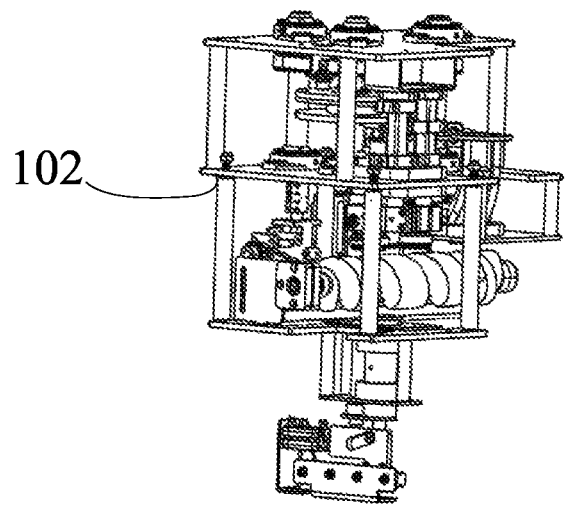
FIG. 3 is a perspective view from the front and side of the first embodiment of the invention.
Figure 4:
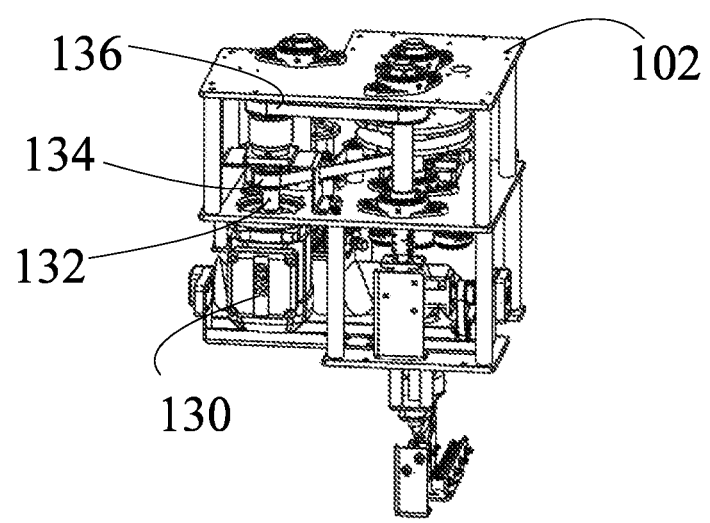
FIG. 4 is an elevated perspective view from the rear and side of the first embodiment of the invention.

FIG. 3 is a perspective view from the front and side of the first embodiment of the invention and FIG. 4 is an elevated perspective view from the rear and side of the first embodiment of the invention. Mechanical drive (motor) 130 rotates main drive shaft 132 which carries a pulley whose rotation in turn causes the motion of the first serpentine drive belt 134, while another pulley may motivate second serpentine drive belt 136. These belts (which need not be serpentine nor even belts, gears or chains or the like may be used) in turn are used to provide power throughout the small machine, all from one or two motors.

Figure 5:
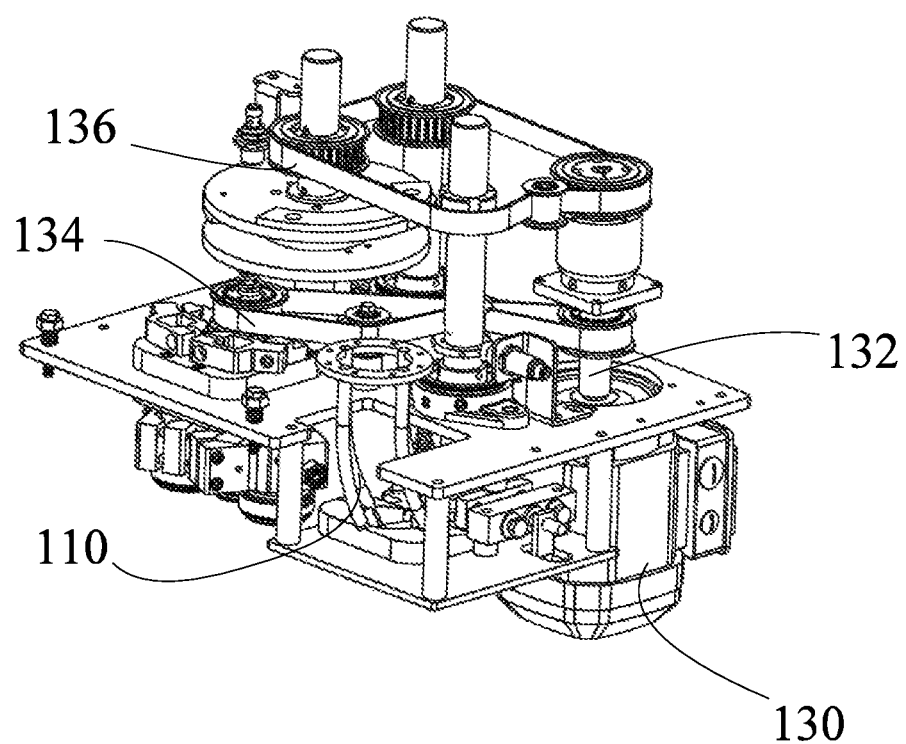
FIG. 5 is an elevated perspective view from the front and side of the first embodiment of the invention with a good deal of the frame and structure removed to more clearly show the serpentine path of the drive belts.

FIG. 5 is an elevated perspective view from the front and side of the first embodiment of the invention with a good deal of the frame and structure removed to more clearly show the serpentine path of the drive belts. The motor, which may be electric, may be clearly seen to drive multiple shafts which carry out multiple operations: moving of cans, seaming of lids, lifting of cans, and so forth.

Figure 6:
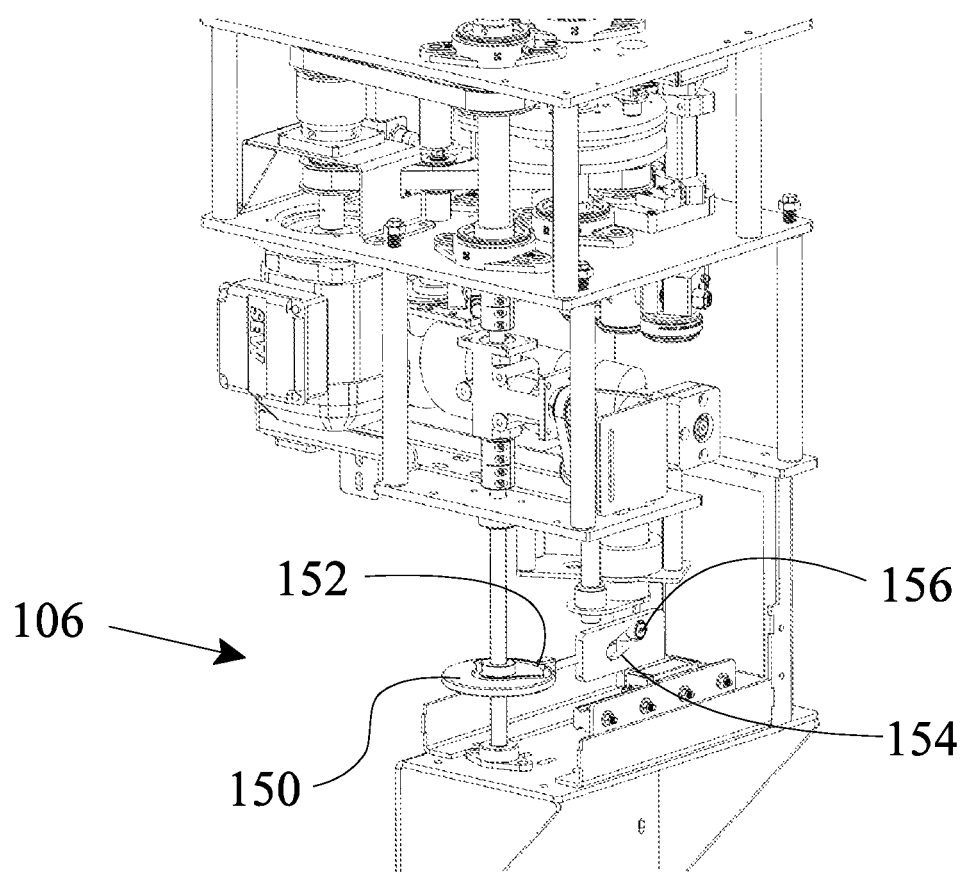
FIG. 6 is an elevated perspective view from the rear and side of a second embodiment of the invention with a can lifter.

FIG. 6 is an elevated perspective view from the rear and side of a second embodiment of the invention with a can lifter. Complex cam 150 operates in a first dimension to move a seamer head about the lip of a can, or more accurately in this embodiment, to rotate a can which is raised up into contact with the head. Trapped cam follower 152 within cam 150 dictates the rotation in the horizontal plane of the can. Vertical cam 154 has its trapped cam follower 156 which causes vertical motion of the can lifter body 158 (see FIG. 7), which in turn lifts the can into contact with the seamer heads.

Note that the two cams combine to form a three dimensional cam assembly (not a more complex "true" three dimensional cam).

Importantly, these complex cams depicted are of course merely exemplary: other cam profiles may be used with the machine depending upon needs.

Figure 7:
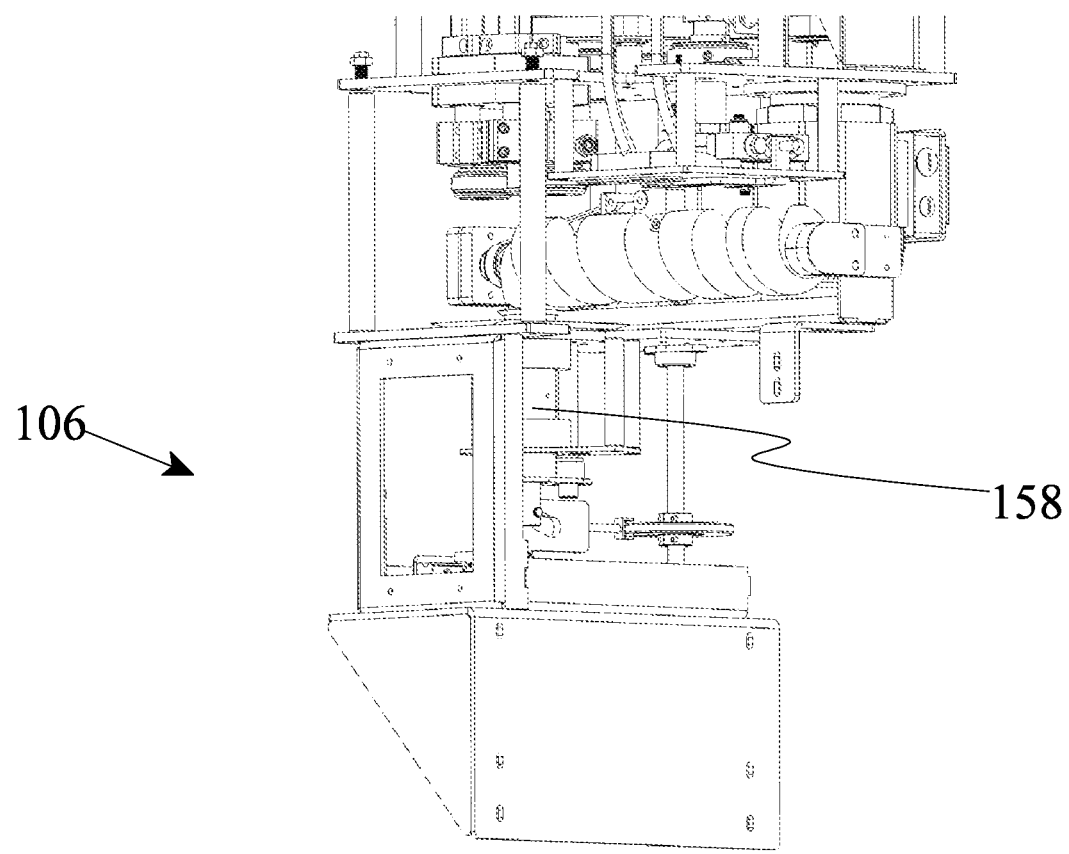
FIG. 7 is a depressed angle perspective view from the rear and side of the second embodiment of the invention with a can lifter.

FIG. 7 is a depressed angle perspective view from the rear and side of the second embodiment of the invention with a can lifter. Can lifter body 158 is the device which holds the can lifter head (see FIG. 8) and which allows the rotatation of the head and can upon it. The actual drive of the rotation comes from the top end of the can as described below in relation to FIGS. 10 and 11. Note in this diagram and the next right angle brackets to facilitate mounting directly to the end of a filler machine, even a filler machine made by a diverse manufacturer.

Figure 8:
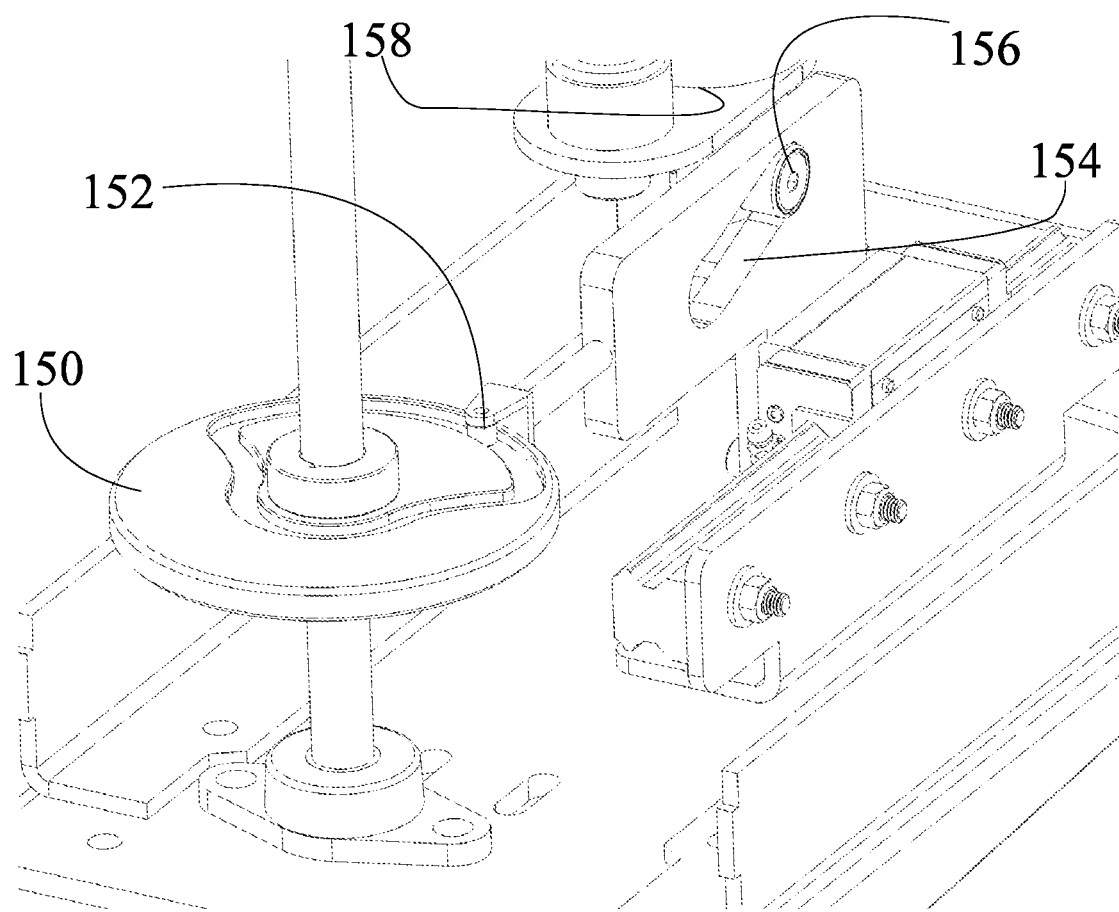
FIG. 8 is a detail view of one exemplary three-dimensional camming mechanism of the can lifter.
Figure 9:
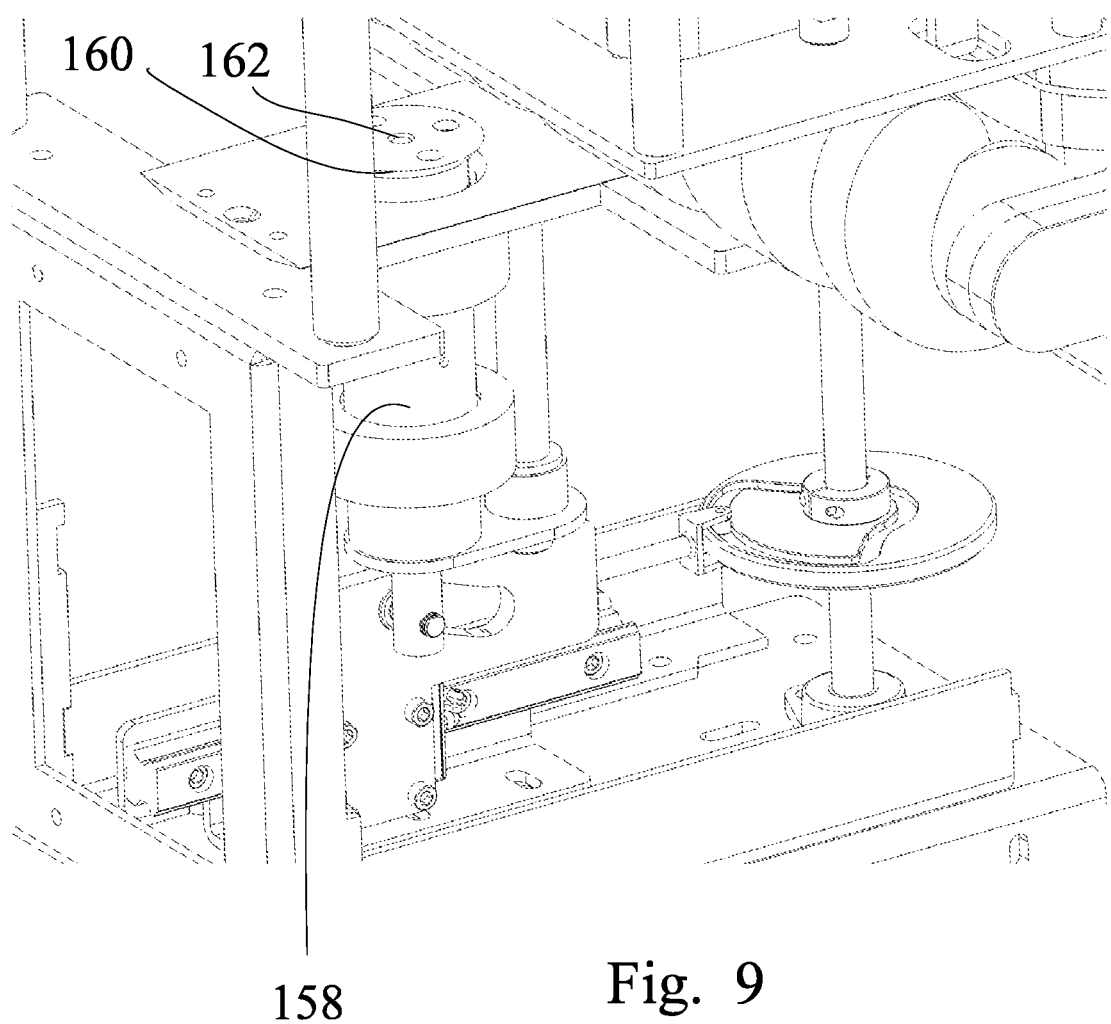
FIG. 9 is another detail view of the can lifter mechanism.

FIG. 8 is a detail view of one exemplary three-dimensional camming mechanism of the can lifter. FIG. 9 is another detail view of the can lifter mechanism.

Can lifter head 160 is the upper end of the can lifter body 158, and is dimensioned and configured to engage the "dome" or bottom end of a can. An aperture in the lifter head allows adjustment of the vertical pre-load applied between the can and seaming heads during seaming. This spring pressure adjustment further helps provide precise seaming.

Figure 10:
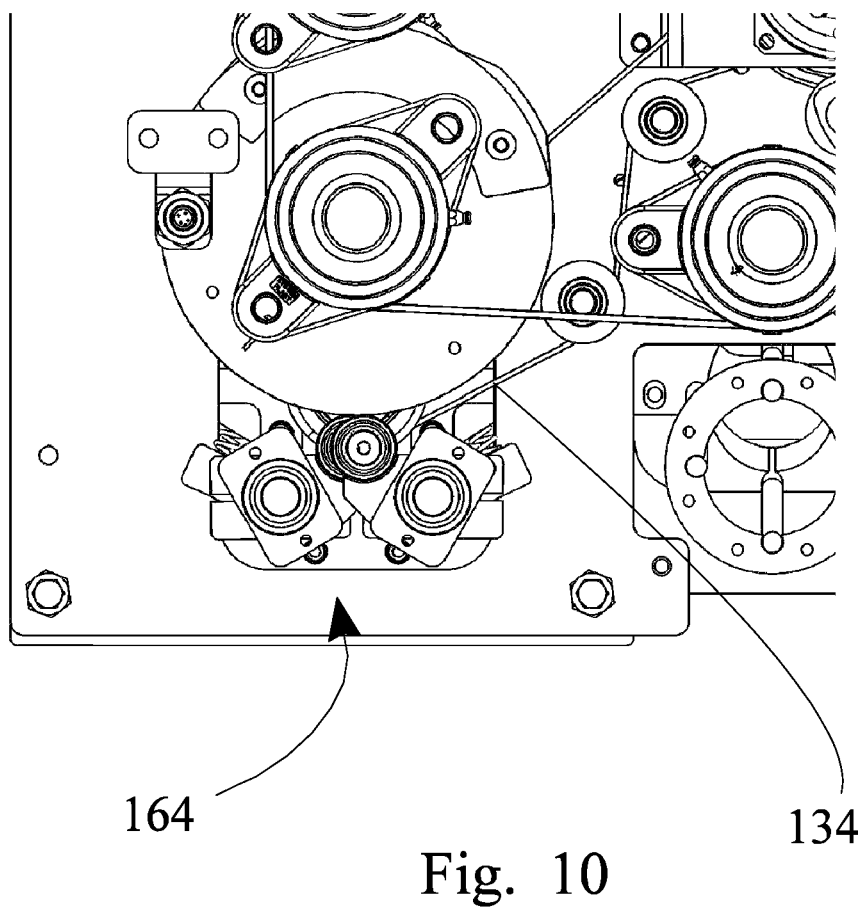
FIG. 10 is a partial view with some framework and other structure removed, in top view, of details of the cams which drive the seamer head chuck and rollers.
Figure 11:
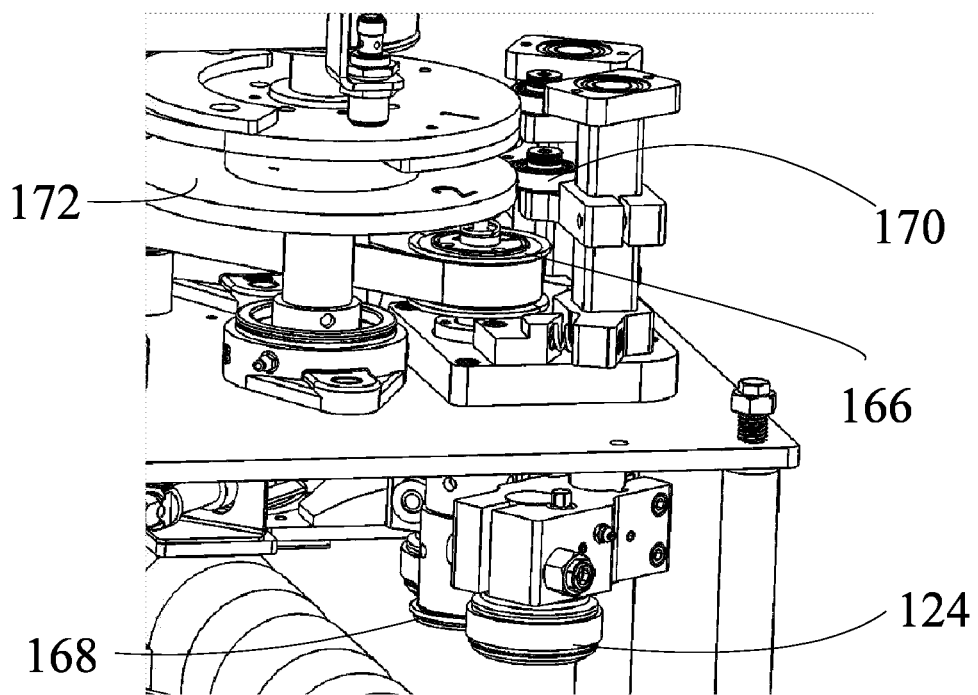
FIG. 11 is an elevated perspective view of the seamer head.

FIG. 10 is a partial view with some framework and other structure removed, in top view, of details of the cams which drive the seamer head chuck and rollers. FIG. 11 is an elevated perspective view of the seamer head. Seamer head 164 has on it both a central chuck which engages to the top of the can/can lid and rotates the can, as well as at least one (two in the embodiment shown), seamer rollers which roll freely against the can when the can is lifted into place against them and rotates by the chuck. Seamer head central chuck pulley 166 may be seen engaged to serpentine belt 134 (but it may be driven by other belts or other means as appropriate) and thus by means of the seamer head central chuck shaft, drives seamer head central chuck 168, thus turning the can. Seamer roll cam follower 170 controls the motions of the seamer rolls/heads into and out of contact with the can lid: these crimp or seam the lid down over the can lip. Seamer roll cam 172 of course controls the motions of the cam follower 170.

As with the complex cams discussed earlier in regard to the lifter, the cams/followers shown are merely exemplary.

Figure 12:
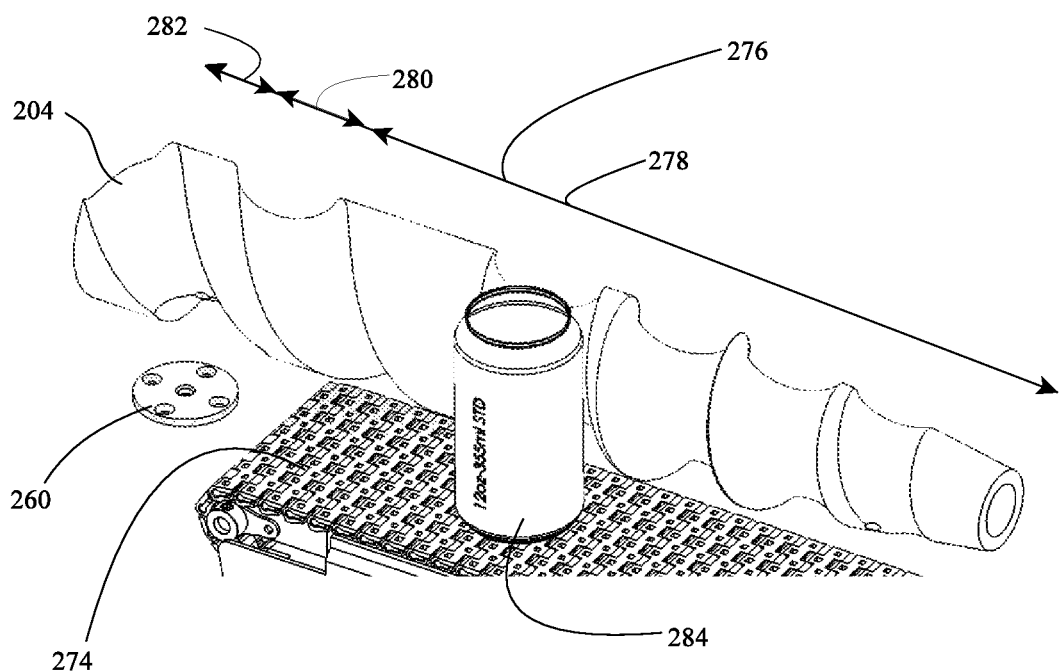
FIG. 12 is an elevated perspective view of the worm gear of the invention showing only the worm gear, the can path parallel to it, and a single can being moved along the worm gear prior to being seamed.

FIG. 12 is an elevated perspective view of the worm gear of the invention showing only the worm gear, the can path parallel to it, and a single can being moved along the worm gear prior to being seamed.

It may be seen that the threading of the worm drive 204 is of sufficient size to mechanically engage a can 284 in can path 274. Note that can path 274 is basically represented by a portion of the conveyor system which the can 284 travels along, but the can path 274 may be any useful mechanical device, including lifter head base plate 260 (with adjustment apertures similar to 162), a fence or rail, trough, etc, and may be straight, curved, angled, etc.

Worm drive 204 may be seen to have variable pitch threads: some threads have an angle which is sufficient to propel the can 284 along the can path 274, while other threads in the dwell portion are almost perpendicular to the axis of worm drive 204 and thus while the worm drive rotates, the can 284 does not move.

Actually, the worm drive may have only a single long thread. Thus the different threads are actually just the same single thread extending along the worm drive length 276. In first portion 278, the thread is at an angle which is neither 0 degrees nor 90 degrees to the axis and length of the worm drive 204, and thus the continuous rotation of the worm drive forces the can 284 along the can path 274 at a speed which is directly dependent upon the speed of rotation of the worm drive 204.

However, as the can 284 traverses the threading of the worm drive and the can path, it eventually enters the threading second portion 280, the dwell. Second dwell portion 280 is perpendicular to the direction of the length/axis of the worm drive 204 (at a 90 degree angle thereto and a pitch angle of 0 degrees) and thus while this section/part of the threading (second portion 280, the dwell) is rotating about the can 284, the can actually remains stationary in the can path, unmoving.

Figure 13:
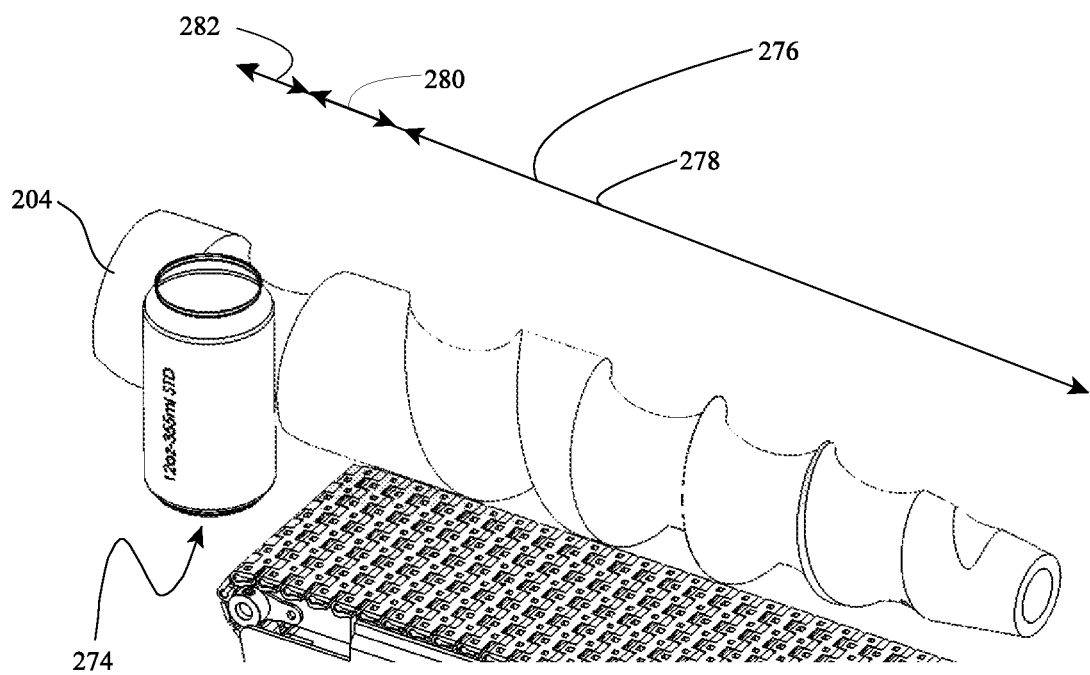
FIG. 13 is an elevated perspective view of the worm gear of the invention showing only the worm gear, the can path and the can, now positioned in the second portion of the worm gear and thus not moving despite the continuous motion of the worm gear. In this position the can is ready for seaming.

FIG. 13 is an elevated perspective view of the worm gear of the invention showing only the worm gear 204, the can path 274 and the can 284, now positioned in the second portion of the worm gear and thus not moving despite the continuous motion of the worm gear 204. This becomes an excellent time to employ a can lifter and can seamer to put a lid upon the otherwise stationary can. Thus the can may be seen to be slightly elevated by the lifter head 260 (not visible with the can 284 atop it), but the can path 274 still exists, in this case the can path is the unseen lifter head.

Note that the threads of the worm drive are noticeably thick, having a fair distance between adjacent threads. This distance between the threading allows the worm drive to have the portion 280 which has a flat threading, at 90 degrees to direction of motion, which allows the can to not move. In addition, notice that the time during which the can 284 is able to sit still will of necessity be only the time it sits in the flat threading, which is in general less than a single rotation of the worm drive 204.

Eventually the continuous rotation of the worm drive 204 means that the flat threading second portion 280 is traversed by the stationary can 284, and the can 284 enters the third portion 282 in which it is once again pushed along by the threading.

Figure 14:
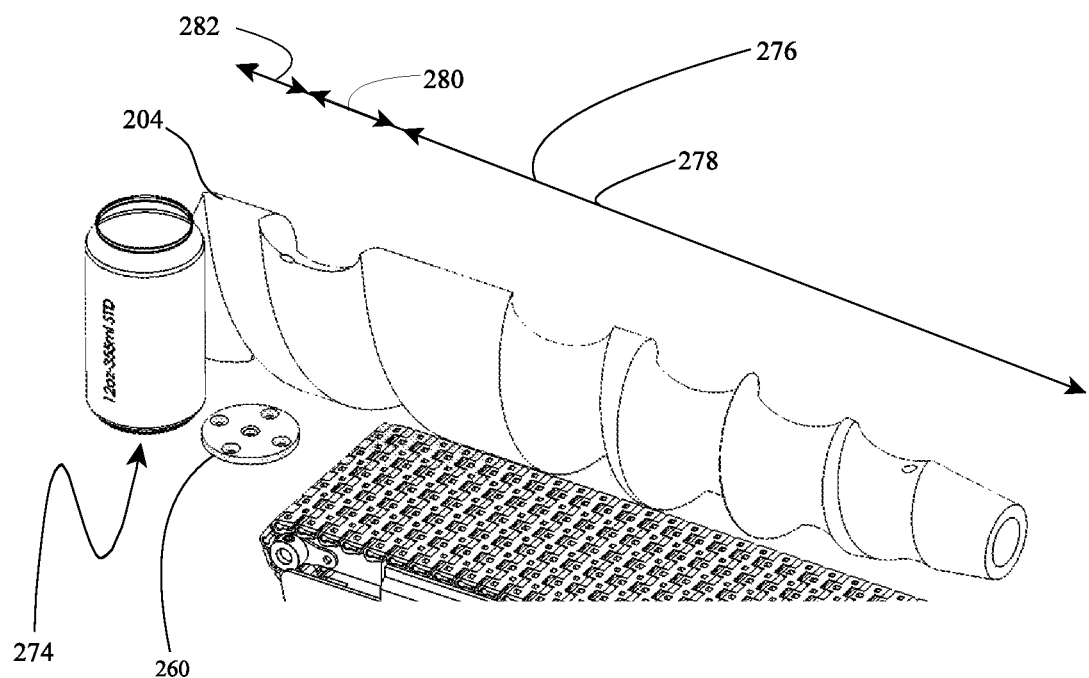
FIG. 14 is a an elevated perspective view of the worm gear of the invention showing only the worm gear, the can path and the can, which now has a lid, in the third portion of the worm gear in which is moving away from the seaming station.

FIG. 14 is a an elevated perspective view of the worm gear of the invention showing only the worm gear, the can path and the can, which now has a lid, in the third portion of the worm gear in which is moving away from the seaming station.

Worm drive 204 and can path 274 cooperate to keep the can on track. As noted previously, the can path 274 is here represented by a portion of a can conveyor, but it is not so limited.

Figure 15:
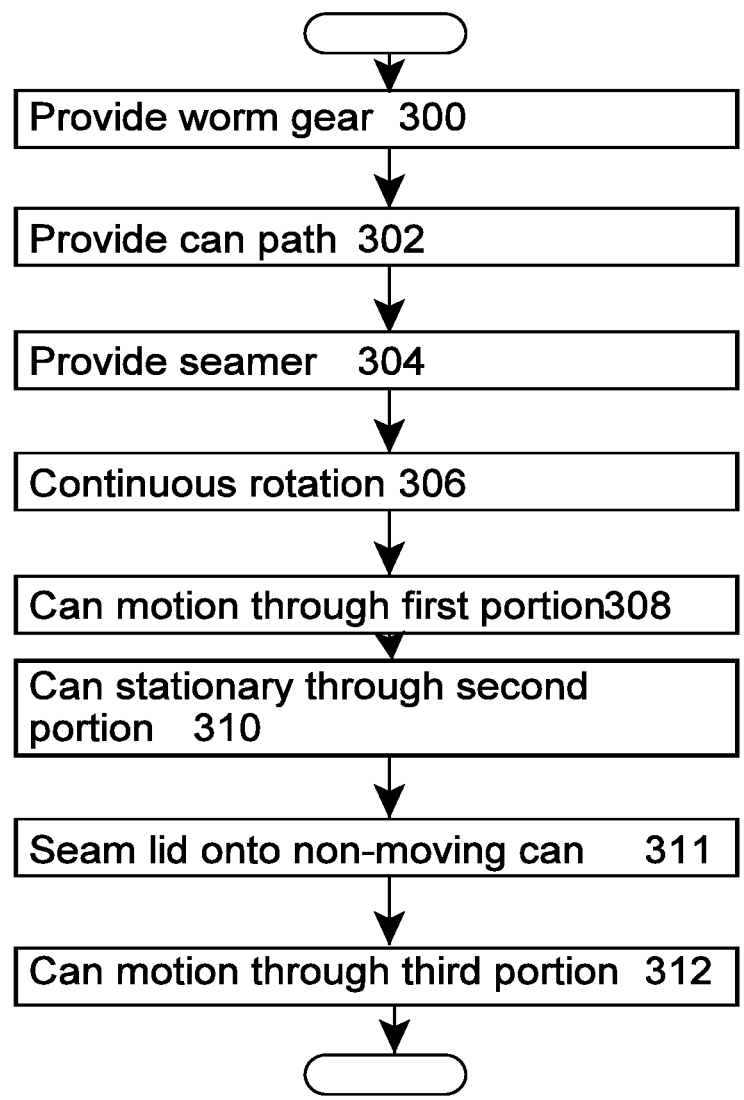
FIG. 15 is a flow chart of the steps of the invention.

FIG. 15 is a flow chart of the steps of the invention. The steps of the invention as shown include the provision of the correctly configured worm drive, can path and seamer, however it may be considered that after this provision the invention may be practiced with the production steps of moving the can and seaming it.

Provide worm gear 300 is the step of providing a worm gear with thick threading which allows it to have the three portions discussed previously: angled for motion on first and third portions closer to the ends and angled perpendicular to the worm gear length/axis for no motion during a brief pause at an intermediate portion.

Provide can path 302 is the provision of a confining can conveyor parallel to the worm drive.

Provide seamer 304 is the provision of a seamer to put the lid on the can at the second portion of the worm gear.

Continuous rotation 306 is an important aspect of the invention. In contrast to prior art "start-stop" small scale seamers, the seamer of the present invention allows for constant rotation of the worm drive, thus speeding up production, increasing machinery life, decreasing out-gassing, decreasing sloshing and in sum lower production time and costs. The variable pitch threading of the worm drive allows cans to pause momentarily even as the worm drive continues to turn. This pause is gentle, without the jerking associated with the entire conveyor of cans being jerked into motion and stopped over and over, and no other can's motion is affected.

Can motion through first portion 308 is the driving of the can gently to the area under the seamer. The worm drive threading is dimensioned and configured to the can diameter so that a mechanical engagement is achieved and the can moves, confined in the can path.

Can motion through second portion 310 however is actually stationary along the can path. The actual motion in this section is a LIFT, and it is believed that no prior art teaches that a can may be lifted while in a continuously moving worm drive: that is, the worm gear is turning even as the can is lifted upward, partially or wholly free of the worm gear. In fact, it is believed that no prior art fails to teach away from the idea of lifting a can while it is meshed with a rotating worm drive and yet sitting still.

Seam lid onto can 311 may thus be accomplished during this phase, while the can is moving only upward in the rotating worm gear.

Can motion through third portion 312 is once again motion along the can path toward other steps of the process, such as packaging or the like.

As discussed previously in regard to FIGS. 12 through 14, during production steps 306 through 312 are continuously repeated.

Throughout this application, various publications, patents, and/or patent applications are referenced in order to more fully describe the state of the art to which this invention pertains. The disclosures of these publications, patents, and/or patent applications are herein incorporated by reference in their entireties, and for the subject matter for which they are specifically referenced in the same or a prior sentence, to the same extent as if each independent publication, patent, and/or patent application was specifically and individually indicated to be incorporated by reference.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims in the utility application to follow are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the claims to follow.

What is claimed is:

1. A continuous motion position controlled in-line linear seamer for use with an open top can and a lid to be seamed onto said can, said can having a closed bottom, said can possibly optionally containing a liquid; the linear seamer comprising:

a linear can path down which said can is conveyed;

a variable pitch worm drive dimensioned and configured to engage said can, the variable pitch worm drive having a length and having angled threads, the threads dimensioned and configured to mechanically engage said can between adjacent threads, whereby in a first portion of the length of the worm drive the turning of the worm drive causes straight line motion of said can;

a lid supply which drops said lid onto said can open top can at a first can position of the worm drive;

a second portion of the length of the worm drive defining a second can position, the second portion of the worm drive having a flat pitch of the variable pitch worm drive threads, whereby in which second portion of the worm drive the turning of the worm drive causes said can to remain stationary in the second can position despite continuous motion of the worm drive;

at least one can seamer roll positioned above said can when said can is disposed in the second position, the at least one seamer roll operative to seam said can lid to said open top can;

a third portion of the worm drive having angled threads driving said can in straight line motion out of the second position and out of the seamer;

a drive motor driving a drive shaft;

at least a first pulley affixed to the drive shaft;

at least a first serpentine belt engaged to the first pulley whereby the first serpentine belt is driven by the drive motor;

a second pulley engaged to and driven by the serpentine belt, the second pulley affixed to at least one seamer shaft whereby the at least one seamer shaft is driven by the drive motor;

the drive motor being an electrical motor;

a frame;

a can lifter, the can lifter having a can lifter body and a can lifter head, the can lifter body, when raised, operative to elevate the can lifter head;

the can lifter being positioned below said can when said can is disposed in the second position, the can lifter operative to lift said can to the at least one seamer roll;

an aperture;

a vertical path cam having a first cam follower therein, the first cam follower linked to said can lifter body and operative to lift said can lifter body;

a horizontal path cam having a second cam follower therein, the second cam follower linked to said can lifter body and operative to shift said can lifter body to match motions of said can while said can is in motion along part of the linear can path;

the vertical and horizontal cams together comprising a three dimensional motion cam assembly;

a seamer head having a rotating central chuck dimensioned and configured to engage said lid and rotate said can against said at least one seamer roll, the seamer head attached to the at least one seamer shaft;

at least one seamer head cam and at least one seamer head follower controlling said at least one seamer roll.

2. The linear seamer of claim 1, further comprising:
control circuitry, the control circuitry including at least a circuit breaker and a control device operative to control operation of one member selected from the group consisting of: the drive motor, the lid supply, the worm drive, the can lifter, the seamer head and combinations thereof.

3. The linear seamer of claim 2, wherein the control circuitry control device further comprises: a programmable logic controller.

4. A method of seaming a lid onto a can in a can path, the method comprising the steps of:
providing a worm drive parallel to said can path, the worm drive having angled threads dimensioned and configured to mechanically engage to said can in said can path, the worm drive having a length and a second portion of the length in which the angled threads are perpendicular to the can path and a first and a third portion of the length in which the angled threads are neither perpendicular nor parallel to said can path;
rotating the worm drive with a continuous motion, whereby said can will be moved along said can path by the rotation of the worm drive when in the first portion of the worm drive length, will pause and sit stationary in the second portion of the worm drive length, and will resume moving along said can path in the third portion of the worm drive length;
providing a lid seamer;
having at least one seamer roll, the lid seamer further comprising:
a seamer head having a rotating central chuck dimensioned and configured to engage said lid and rotate said can;
at least one seamer head cam and at least one seamer head follower controlling said at least one seamer roll;
seaming said lid to said can while said can is stationary in said can path in the second portion of the worm drive length;
providing an electrical drive motor driving a drive shaft;
providing a first pulley affixed to the drive shaft;
providing at least a first serpentine belt engaged to the first pulley whereby the first serpentine belt is driven by the drive motor;
providing a second pulley engaged to and driven by the serpentine belt, the second pulley affixed to at least one seamer shaft, whereby the at least one seamer shaft is driven by the drive motor;
providing a frame;
locating the lid seamer above the second portion of the worm drive length, the lid seamer operative to perform the seaming step;
providing a can lifter positioned below said can when said can is disposed in the second portion of the worm drive length, the can lifter operative to lift said can to the seamer, the can lifter further comprising an aperture;
providing a vertical path cam having a first cam follower therein, the first cam follower linked to said can lifter body and operative to lift said can lifter body;
providing a horizontal path cam having a second cam follower therein, the second cam follower linked to said can lifter body and operative to shift said can lifter body to match motions of said can while said can is in motion along part of the linear can path;
the vertical and horizontal cams together comprising a three dimensional motion cam assembly.

* * * * *